US008153731B2

(12) United States Patent
Göbelt et al.

(10) Patent No.: US 8,153,731 B2
(45) Date of Patent: Apr. 10, 2012

(54) COMB (BLOCK) COPOLYMERS

(75) Inventors: Bernd Göbelt, Wesel (DE); Jürgen Omeis, Dorsten-Lembeck (DE); Ulrich Orth, Wesel (DE); Heribert Holtkamp, Wesel (DE); Marcus Meichsner, Kamp-Lintfort (DE)

(73) Assignee: BYK-Chemie GmbH, Wesel (DE)

( * ) Notice: Subject to any disclaimer, the term of this patent is extended or adjusted under 35 U.S.C. 154(b) by 479 days.

(21) Appl. No.: 12/521,163

(22) PCT Filed: Dec. 21, 2007

(86) PCT No.: PCT/EP2007/011328
§ 371 (c)(1),
(2), (4) Date: Jun. 25, 2009

(87) PCT Pub. No.: WO2008/080579
PCT Pub. Date: Jul. 10, 2008

(65) Prior Publication Data
US 2010/0099813 A1    Apr. 22, 2010

(30) Foreign Application Priority Data
Dec. 27, 2006  (DE) .................. 10 2006 062 439

(51) Int. Cl.
*C08F 8/32* (2006.01)
(52) U.S. Cl. ............... 525/327.6; 525/374; 525/379; 525/380
(58) Field of Classification Search ............... 525/327.6, 525/374, 379, 380
See application file for complete search history.

(56) References Cited

U.S. PATENT DOCUMENTS

| 5,364,909 A | 11/1994 | Guo et al. |
| 5,420,200 A | 5/1995 | Koning et al. |
| 6,239,226 B1 * | 5/2001 | Fischer et al. .................. 525/256 |
| 6,291,620 B1 | 9/2001 | Moad et al. |
| 6,310,143 B1 | 10/2001 | Vickers, Jr. et al. |
| 6,406,143 B1 | 6/2002 | Chen et al. |
| 7,550,019 B2 * | 6/2009 | Krull et al. ........................ 44/393 |
| 7,619,050 B2 * | 11/2009 | Nesvadba et al. ............... 526/204 |
| 2003/0158346 A1 | 8/2003 | Zhang et al. |
| 2007/0269670 A1 * | 11/2007 | Wilmer et al. .................. 428/500 |
| 2009/0270543 A1 * | 10/2009 | Mongoin et al. ............... 524/426 |

FOREIGN PATENT DOCUMENTS

| CN | 1693312 A | 11/2005 |
| CN | 1693317 A | 11/2005 |
| EP | 0270126 A2 | 4/1987 |
| EP | 0805183 | * 11/1997 |
| EP | 1 026 178 A | 8/2000 |
| EP | 1026178 A1 | 8/2000 |
| EP | 1 046 685 A | 10/2000 |
| EP | 1046685 A1 | 10/2000 |
| JP | 08-081563 | 3/1996 |
| JP | 2000-226414 | 8/2000 |
| WO | 98/01478 A1 | 1/1998 |
| WO | 98/58974 A1 | 12/1998 |
| WO | 99/05099 A1 | 2/1999 |
| WO | 03/082941 A1 | 10/2003 |

OTHER PUBLICATIONS

Buxbaum et al., "Industrial Inorganic Pigments", Wiley-VCH Verlag GmbH & Co KGaA, 3rd Edition, (2005).
Hawker et al., "New Polymer Synthesis by Nitrixide Mediated Living Radical Polymerizations", Chen. Rev. vol. 101, No. 12, pp. 3661-3688, (2001).
Herbst et al., "Industrielle Organische Pigmente" VCH Verlagsgesellschaft mbH, Wiley-VCH, (1987).
Moad et al., "Living Radical Polymerization by the RAFT Process", Aust. J. Chem. vol. 58, p. 379-410, (2005).
Moad et at., "Living Free Radical Polymerization with Reversible Addition—Fragmentation Chain Transfer (the Life of RAFT)", Society of Chemical Industry, Polym Int., vol. 49, p. 993-1001, (2000).
Nicolas et al., "Nitroxide-Mediated Controlled Free-Radical Emulsion Polymerization of Styrene and n-Butyl Acrylate with a Water-Soluble Alkoxyamine as Initiator", Angew. Chem. Int. Ed., vol. 43, p. 6186-6189, (2004).
Perrier et al., "Macromolecular Design via Reversible Addition-Fragmentation Chain Transfer (RAFT)/Xanthates (MADIX) Polymerization", Journal of Polymer Science, vol. 43, pp. 5347-5393, (2005).
Chun-Yan Hong, et al., A new approach to functionalize multi-walled carbon nanotubes by the use of functional polymers, Polymer 47, pp. 4300-4309, (2006).
Hua-ming Li et al., "Preparation and characterization of maleic anhydride-functionalized syndiotactic polystyrene", Polymer 43, pp. 5455-5461, (2000).
"International Preliminary Report of Patentability" issued Jul. 9, 2009.

* cited by examiner

*Primary Examiner* — Bernard Lipman
(74) *Attorney, Agent, or Firm* — Norris McLaughlin & Marcus PA

(57) ABSTRACT

The present invention relates to comb (block) copolymers obtainable by reacting

I at least one (block) copolymer comprising polymerized, optionally substituted styrene and maleic anhydride units, which copolymer has been obtained by living, free-radical polymerization, with II at least one polyalkylene oxide monoamine comprising a primary amino end group at a reaction temperature of $\geq 150°$ C.

and by subsequent salification of at least 25 mol % of the free carboxyl groups of the reaction product at a reaction temperature of $<100°$ C. and optionally after addition of $H_2O$ and to the use of these comb copolymers as wetting agents and dispersants.

24 Claims, No Drawings

COMB (BLOCK) COPOLYMERS

This is a 371 of PCT/EP2007/011328 filed 21 Dec. 2007 (international filing date).

The present invention relates to comb (block) copolymers obtainable by reacting

I at least one (block) copolymer comprising polymerised, optionally substituted styrene and maleic anhydride units, which copolymer has been obtained by living, free-radical polymerisation, with II at least one polyalkylene oxide monoamine comprising a primary amino end group at a reaction temperature of ≧150° C.

and by subsequent salification of at least 25 mol % of the free carboxyl groups of the reaction product at a reaction temperature of <100° C. and optionally after addition of $H_2O$.

BACKGROUND OF THE INVENTION

It is known that many comb copolymers may be used as wetting agents and dispersants, in particular for pigments. Comb copolymers are accordingly already known from the prior art which are obtained by reacting styrene/maleic anhydride copolymers (SMA resins) with polyalkylene oxide amines and polyalkylene oxide glycols. U.S. Pat. No. 6,310,143 describes comb copolymers produced in this manner which, in addition to imide structures, must mandatorily comprise amide and ester linkages of the side chain to the main chain, as a result of which these comb copolymers do not exhibit the hydrolysis resistance necessary for numerous applications as dispersants and wetting agents.

The same also applies to the comb copolymers known from U.S. Pat. No. 6,406,143 which do not comprise any imide groups, but instead only amide and ester linkages of the side chains with the main chain of styrene/maleic anhydride copolymer.

Against the background of this prior art, there was therefore a need to provide comb copolymers based on styrene/maleic anhydride copolymers having linear polyalkylene oxide polymers as side chains, which have not only outstanding hydrolysis resistance but also an outstanding wetting and dispersing effect and are thus ideally suitable for many areas of application, in particular for the production of pigment pastes and the use thereof in various products.

SUMMARY OF THE INVENTION

The object of the present invention was accordingly to provide comb copolymers based on styrene/maleic anhydride copolymers having linear polyalkylene oxide side chains, which copolymers lead to an improved wetting and dispersing effect in dispersions of solids, in particular of pigment dispersions.

This object is achieved by the provision of the comb (block) copolymers according to the invention which are obtainable by reacting I at least one (block) copolymer comprising polymerised, optionally substituted styrene and maleic anhydride units, which copolymer has been obtained by controlled free-radical polymerisation, with II at least one polyalkylene oxide monoamine comprising a primary amino end group at a reaction temperature of ≧150° C. and by subsequent salification of at least 25 mol % of the free carboxyl groups of the reaction product at a reaction temperature of <100° C. with II, optionally other tertiary amines and optionally after addition of $H_2O$.

DETAILED DESCRIPTION

The SMA resins used as the main chain in the reaction are optionally substituted styrene/maleic anhydride copolymers, it being possible for the styrene optionally to be substituted with alkyl groups having 1 to 15 C atoms, preferably with methyl, with aryl groups having 6 to 18 C atoms, halogen, preferably chlorine, or at least one nitro group.

Thus, according to the invention, the "S" of the term "SMA resin" is taken to mean both a substituted and an unsubstituted styrene.

The SMA resins may have a stable, alternating, gradient-type or block-type structure.

The SMA resins for the polymers according to the invention are preferably produced by the following controlled free-radical polymerisation processes:

the "Reversible Addition Fragmentation Chain Transfer Process" (RAFT), which when certain polymerisation regulators are used is also known as "MADIX" and "Addition Fragmentation Chain Transfer" and is here designated merely as RAFT, as for example disclosed in Polym. Int. 2000, 49, 993, Aust. J. Chem 2005, 58, 379, J. Polym. Sci. Part A: Polym. Chem. 2005, 43, 5347, U.S. Pat. No. 6,291,620, WO 98/01478, WO 98/58974 and WO 99131144 or, controlled polymerisation using nitroxyl compounds as polymerisation regulator (NMP), as for example disclosed in Chem. Rev. 2001, 101, 3661.

The C-RAFT process, which is described in U.S. Pat. No. 6,291,620, is particularly preferred as polymerisation technology. The corresponding disclosures are hereby introduced as part of the disclosure of the present application. The SMA resins are particularly preferably produced by controlled free-radical polymerisation in the presence of 2,4-diphenyl-4-methyl-1-pentene as chain-transfer agent.

The optionally substituted styrene/maleic anhydride molar ratio in SMA resins produced in this manner is preferably 1:1 to 8:1. An optionally substituted styrene/maleic anhydride molar ratio of 1:1 to 2:1 is particularly preferred. The number-average molecular weight of the SMA resins used is preferably between 1000 g/mol and 20,000 g/mol (determined by GPC).

The monofunctional initiators used for preparing the SMA resins according to the invention start a polymer chain with only one direction of growth. The monofunctional initiators used in the particular living, controlled polymerisation process are known to an average person skilled in the art. Initiators which may be used are, for example, azoinitiators such as azodiisobutyronitrile, peroxide compounds, such as dibenzoyl peroxide and dicumyl peroxide as well as persulfates such as potassium peroxydisulfate.

Examples of polymerisation regulators are stated in the above-cited literature; 2,2,6,6-tetramethylpiperidinoxyl (TEMPO) or N-tert-butyl-N-[1-diethylphosphono-(2,2-dimethylpropyl)]nitroxyl are for example suitable for NMP, while thiocarboxylic acid esters, xanthogenic acid esters or 2,4-diphenyl-4-methyl-1-pentene are for example suitable for RAFT.

Moreover, in NMP, adducts of the initiator with the polymerisation regulator may be used, as is for example described in Chem. Rev. 2001, 101, 3661, "V. Approaches to Alkoxyamines" or in Angewandte Chemie Int. Ed. 2004, 43, 6186.

Polymerisation may proceed in organic solvents. Examples of suitable solvents are aromatic compounds such as xylene or carboxylic acid esters such as 2-methoxypropyl acetate or butyl acetate.

The polymerisation temperature depends on the polymerisation technology and the half-life of the initiators used. It is generally between 60° C. and 200° C., preferably between 100° C. and 160° C.

Polyalkylene oxide monoamines used for producing the comb (block) copolymers according to the invention are preferably $C_1$-$C_4$ monoalcohol-started polyethers which are made up of ethylene oxide and propylene oxide units and bear a primary amino group as end group. The weight ratio of ethylene oxide to propylene oxide units should preferably be between 5:95 and 100:0, particularly preferably between 30:70 and 70:30. The number-average molecular weight of the polyalkylene oxide monoamines used is preferably between 500 g/mol and 3000 g/mol (determined from amine value or by $^1$H-NMR spectroscopy).

The reaction with the (block) copolymer I at a reaction temperature of $\geq$150° C. may be performed using a polyalkylene oxide monoamine which differs from the polyalkylene oxide monoamine which is used for salifying the free carboxyl groups of the reaction product. It is preferably identical.

Furthermore, up to 50% of the polyalkylene oxide monoamine necessary for salification may be replaced by another amino compound, preferably by at least one tertiary monoamine compound, such as for example N,N-dimethylethanolamine, N,N-diethylethanolamine, N,N-dibutylethanolamine, methyldiethanolamine, ethyldiethanolamine or triethanolamine.

The comb (block) copolymers according to the invention are preferably obtainable by initially partially dissolving at least one SMA resin, which has been produced by living, free-radical polymerisation using 2,4-diphenyl-4-methyl-1-pentene, in a suitable solvent. At least one polyalkylene oxide monoamine is added thereto in a molar ratio of the amino component to the maleic anhydride units of the SMA resins of 75% to 25% and reacted at reaction temperatures of $\geq$150° C., preferably of $\geq$160° C. for a period such that preferably at least 25 mol %, particularly preferably at least 50 mol % of the anhydride structures of the (block)copolymer have been reacted. In this case, the primary amino groups react with the anhydride structures of the (block)copolymer almost exclusively to yield imide structures. The initially added solvent is preferably removed by distillation during the reaction. Since water is formed during imide formation, further anhydride structures of the (block) copolymer may be released to yield carboxylic acid functions. Once the reaction temperature has been reduced, additional water may optionally be added to the reaction mixture if this is necessary. The reaction mixture is preferably cooled to <100° C. before adding further polyalkylene oxide monoamine for further salification of the free carboxyl groups, preferably the polyalkylene oxide monoamine which has already been used for the reaction at $\geq$150° C. or a polyalkylene oxide monoamine differing therefrom and/or optionally additionally a low molecular weight tertiary monoamine, as stated above.

The polyalkylene oxide monoamine component is preferably added in 2 parts, the first proportion being calculated in line with the above-stated, desired degree of conversion of the anhydride groups to imide structures, while the remainder or 2nd proportion of the polyalkylene monoamine and of the optionally also used tertiary monoamine is determined according to the degree of salification of at least 25 mol %, preferably of at least 50 mol %, of the free carboxyl groups of the reaction product.

Also using a solvent for the (block) copolymer during the reaction with the polyalkylene oxide monoamine component ensures that all the anhydride groups of the (block) copolymers are largely equivalently capable of reacting right from the beginning of the reaction. A more homogeneous product is obtained in this manner.

The salified reaction product may be diluted by adding water.

According to the invention, a comb (block) copolymer is taken to mean a polymer, the copolymer or block copolymer of which as the base polymer or main chain is substantially covalently bonded via amide and imide bonds with linear, polymeric side chains.

The comb (block) copolymers according to the invention are suitable as wetting agents and dispersants for many applications known from the prior art. These may accordingly be used, for example, in the production or processing of coating materials, printing inks, inks for inkjet processes such as for inkjet printers, paper coatings, leather and textile dyes, pastes, pigment concentrates, ceramics, cosmetic preparations, preferably whenever solids such as pigments and/or fillers are present. The comb (block) copolymers according to the invention may also be used in the production or processing of casting and/or moulding compositions based on synthetic, semi-synthetic or natural polymers such as for example polyvinyl chlorides, saturated or unsaturated polyesters, polyurethanes, polystyrenes, polyacrylates, polyamides, epoxy resins, polyolefins such as polyethylenes or polypropylenes. The comb (block) copolymers according to the invention may, for example, be used in the production of casting compositions, PVC plastisols, gel coats, polymer concrete, printed circuit boards, industrial, wood and furniture coatings, vehicle coatings, marine paints, corrosion protection paints, can and coil coatings, decorator's and architectural paints, it being possible for conventional known binders and/or solvents, pigments and optionally fillers, the comb (block) copolymers according to the invention and conventional auxiliary substances optionally to be incorporated.

Examples of conventional binders are resins based on polyurethanes, cellulose nitrates, cellulose acetobutyrates, alkyd, melamine, polyester, chlorinated rubber, epoxy and acrylate.

The comb (block) copolymers according to the invention are also suitable as wetting agents and dispersants for the production of water-based coatings, such as cathodic or anodic electro-dipcoatings for example for automotive bodies. Further examples of use as a dispersant are renders, silicate paints, emulsion paints, aqueous coating compositions based on water-dilutable alkyds, alkyd emulsions, hybrid systems, 2-component systems, polyurethane and acrylate dispersions.

The comb (block) copolymers according to the invention are in particular also suitable for producing concentrates of solids, preferably pigment concentrates. To this end, they are initially introduced into a carrier medium such as organic solvents, plasticisers and/or water, and the solids to be dispersed are stirred in. These concentrates may additionally contain binders and/or other auxiliary substances. It is, however, also advantageously possible to use the comb (block) copolymers according to the invention to produce stable, binder-free pigment concentrates. It is likewise possible to use the comb (block) copolymers according to the invention to produce flowable pigment concentrates from pigment press cake. In this case, a comb (block) copolymer according to the invention is incorporated into the press cake, which may still contain water, and the resultant blend is dispersed. Such concentrates of solids, preferably pigment concentrates, may then be incorporated into various substrates such as for example alkyd resins, polyester resins, acrylate resins, polyurethane resins or epoxy resins. Pigments which are dispersed directly into the comb (block) copolymers according to the invention without solvent are particularly suitable for pigmenting thermoplastic and thermosetting plastics formulations.

The comb (block) copolymers according to the invention may advantageously also be used in the production of inks for "non impact" printing processes such as "thermal inkjet" and the "bubblejet process". These inks may be, for example, aqueous ink formulations, solvent-based ink formulations, solvent-free or low-solvent inks for UV applications as well as waxy inks.

The comb (block) copolymers according to the invention may also be used in the production of cosmetic preparations such as for producing make-up, powders, lipsticks, hair dyes, creams, nail polishes and sunscreen preparations. These may assume the form of conventional formulations such as W/O or O/W emulsions, solutions, gels, creams, lotions or sprays. The comb (block) copolymers according to the invention or the above-stated blends thereof may here already be used as dispersants in the dispersions used for producing these preparations. These dispersions may comprise conventional cosmetic carrier media, such as for example water, castor oils or silicone oils, and solids, such as for example organic and inorganic pigments such as titanium dioxide or iron oxide.

The present invention also provides the use of the comb (block) copolymers according to the invention as wetting agents and dispersants. These wetting agents and dispersants are preferably used for the above-described applications.

Another application is the production of a pigmented coating on a substrate, the pigmented coating being applied onto the substrate and the applied pigmented coating being stoved or cured or crosslinked.

The comb (block) copolymers according to the invention may optionally be used in their applications together with conventional prior art binders. For use in polyolefins, it may, for example, be advantageous to use appropriate low molecular weight polyolefins as carrier materials together with at least one comb (block) copolymer according to the invention.

One use according to the invention inter alia also involves the production of dispersible solids in the form of pulverulent and/or fibrous particles, in particular the production of dispersible pigments or plastics fillers, it being possible for the particles to be coated with a comb (block) copolymer according to the invention. Such coatings of organic or inorganic solids are applied in known manner, as described, for example, in EP-A-0 270 126. The solvent or emulsifier may in this case either be removed or remain in the blend, forming a paste. Such pastes are standard commercial products which may optionally contain binders and further auxiliary substances and additives.

Specifically in the case of pigments, modification, i.e. coating, of the pigment surface by addition of the comb (block) copolymers according to the invention may proceed during or after synthesis of the pigments, i.e. by adding them to the pigment suspension or during or after pigment finishing.

The pigments pretreated in this manner are distinguished by enhanced incorporability and by improved viscosity, flocculation and gloss behaviour and by a higher colour intensity relative to pigments which have not been surface-treated.

The comb (block) copolymers according to the invention are suitable as wetting agents and dispersants for numerous pigments such as mono-, di-, tri- and polyazo pigments, oxazine, dioxazine, thiazine pigments, diketopyrrolopyrroles, phthalocyanines, ultramarine and other metal complex pigments, indigoid pigments, diphenylmethane, triarylmethane, xanthene, acridine, quinacridone, methine pigments, anthraquinone, pyranthrone, perylene and other polycyclic carbonyl pigments. Further examples of organic pigments which are dispersible according to the invention may be found in the monograph: W. Herbst, K. Hunger "Industrial Organic Pigments", 1997 (publisher: Wiley-VCH, ISBN: 3-527-28836-8). Examples of inorganic pigments which are dispersible according to the invention are pigments based on carbon black, graphite, zinc, titanium dioxide, zinc oxide, zinc sulfide, zinc phosphate, barium sulfate, lithophone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminium (for example nickel/titanium yellow, bismuth vanadate/molybdate yellow or chromium/titanium yellow). Further examples are stated in the monograph: G. Buxbaum "Industrial Inorganic Pigments", 1998 (publisher: Wiley-VCH, ISBN: 3-527-28878-3). Inorganic pigments may also be magnetic pigments based on pure iron, iron oxides and chromium oxides or mixed oxides, metal effect pigments made from aluminium, zinc, copper or brass as well as pearlescent pigments, fluorescent and phosphorescent luminescent pigments.

Nanoscale, organic or inorganic solids with particle sizes below 100 nm, such as certain grades of carbon black or particles consisting of a metal or semimetal oxide or hydroxide, and particles consisting of mixed metal and/or semimetal oxides or hydroxides may be dispersed with the assistance of the comb copolymers according to the invention or the above-stated blends thereof. Oxides suitable for this purpose are oxides and/or oxide/hydroxides of aluminium, silicon, zinc, titanium, which may be used for producing such extremely finely divided solids. These oxide or hydroxide or oxide/hydroxide particles may be produced by various methods, for example ion exchange processes, plasma processes, sol-gel processes, precipitation, comminution (e.g. by grinding) or flame hydrolysis etc. These nanoscale solids may also comprise "hybrid" particles which are made up of an inorganic core and an organic shell or vice versa.

Pulverulent or fibrous fillers which may be dispersed according to the invention are inter alia those made up of pulverulent or fibrous particles of aluminium oxide, aluminium hydroxide, silicon dioxide, diatomaceous earth, siliceous earth, quartz, silica gel, talcum, kaolin, mica, perlite, feldspar, slate flour, calcium sulfate, barium sulfate, calcium carbonate, calcite, dolomite, glass or carbon. Further examples of dispersible pigments or fillers may also be found in EP-A-0 270 126. Flame retardants such as for example aluminium or magnesium hydroxide and matting agents such as for example silicas may likewise be excellently dispersed and stabilised with the comb (block) copolymers according to the invention.

The present invention accordingly also provides coating materials, pastes and moulding compositions containing at least one comb (block) copolymer according to the invention and at least one pigment, one organic carrier medium and/or water, and optionally binders and conventional auxiliary substances.

The present invention accordingly also provides the above-stated pigments coated with at least one comb (block) copolymer according to the invention.

EXAMPLES

I Production of Styrene/Maleic Anhydride Copolymers (SMA Resin)

1.1 Polymer 1: Alternating SMA Resin Having a Styrene to MSA Ratio of 2:1

27.3 g of methoxypropyl acetate, 4.2 g of 2,4-diphenyl-4-methyl-1-pentene and 3.3 g of styrene are heated to 140° C. Once the reaction temperature has been reached, 14.4 g of maleic anhydride and 2.3 g of AMBN, partially dissolved in 21.7 g of methoxypropyl acetate, are added in 100 min and 26.8 g of styrene are added in 85 min.

After a subsequent reaction time of 1 h, the polymer solution is cooled to room temperature.

Residual content of 2,4-diphenyl-4-methyl-1-pentene: 0.1%

$M_n$: 2775 g/mol 1.2 Polymer 2: Diblock Copolymer 27.3 g of methoxypropyl acetate, 4.2 g of 2,4-diphenyl-4-methyl-1-pentene are heated to 140° C. Once the reaction temperature has been reached, 14.4 g of maleic anhydride and 2.3 g of AMBN, partially dissolved in 21.7 g of methoxypropyl acetate, are added in 100 min and 26.8 g of styrene are added in 85 min. After a subsequent reaction time of 15 min, 1 g of AMBN, partially dissolved in 10 g of methoxypropylene acetate, and 10 g of styrene are added in 100 min.

After a subsequent reaction time of 1 h, the polymer solution is cooled to room temperature.

Residual content of 2,4-diphenyl-4-methyl-1-pentene: 0.08%

$M_n$: 3156 g/mol

II Reaction of the SMA Resins to Yield Comb Copolymers 2.1 Comb Copolymer 1 (Comparative Example)

100 g of a solution of polymer 1 in methoxypropyl acetate are reacted with 150 g of Jeffamine M 2070 for 4 h at 160° C., the methoxypropyl acetate being removed by distillation.

The mixture is diluted with water to a solids content of 40% by weight.

2.1 Comb Polymer 2

100 g of a solution of polymer 1 in methoxypropyl acetate are reacted with 120 g of Jeffamine M 2070 for 4 h at 160° C., the methoxypropyl acetate being removed by distillation.

Subsequently, the reaction mass is cooled to room temperature and mixed with 30 g of Jeffamine M 2070.

In the last step, the mixture is diluted with water to a solids content of 40% by weight.

Jeffamine M 2070: amine-terminated EO/PO polyether, manufacturer: Huntsman

III Application Tests 3.1 Formulation for Aqueous Pigment Concentrates

|  |  | IRGALITH RED FBN | SUNBRITE YELLOW 275-0536 | Heliogen Blue | Bayferrox 130FS | FINNTITAN R-DI-S | PRINTEX 35 |
|---|---|---|---|---|---|---|---|
| Water | % by weight | 37.8 | 44.5 | 42.5 | 23.4 | 15.4 | 37.5 |
| either comb copolymer 1 or 2 | % by weight | 17.6 | 15.0 | 21.9 | 15.0 | 9.4 | 16.9 |
| BYK ®-019 | % by weight | 0.5 | 0.5 | 0.5 |  | 0.1 | 0.5 |
| BYK ®-024 | % by weight |  |  |  | 1.0 |  |  |
| BYK ®-420 | % by weight |  |  |  | 0.5 |  |  |
| Proxel GXL | % by weight | 0.1 | 0.1 | 0.1 | 0.1 | 0.1 | 0.1 |
| Pigment | % by weight | 44.0 | 40.0 | 35.0 | 60.0 | 75.0 | 45.0 |
|  | % by weight | 100.00 | 100.0 | 100.0 | 100.0 | 100.0 | 100.0 |

BYK ®-019: defoaming agent, manufacturer: Byk Chemie GmbH
BYK ®-024: defoaming agent, manufacturer: Byk Chemie GmbH
BYK ®-420: rheology control agent, manufacturer: Byk Chemie GmbH
Proxel GXL: fungicide, manufacturer: Zeneca The components of the formulation are dispersed for 40 min at 40° C. and 10,000 rpm with the assistance of Dispermat CV 3.2 Formulation for Coating Materials:

| Pigment | IRGALITH RED FBN | Heliogen Blue | Bayferrox 130FS | Printex 35 |
|---|---|---|---|---|
| Pigment concentrate at 3.1 parts by weight | 5 | 5 | 5 | 5 |
| Joncryl 537 parts by weight | 51.3 | 38.1 | 32.5 | 32.5 |

Joncryl 537: aqueous emulsion clear coating material, manufacturer: BASF

For producing the coating material, the components are homogenised mechanically for 10 minutes and applied.

3.3 Test Results

Viscosity of the Pigment Concentrates

Coating according to 3.1 or according to 3.2

Comb Copolymer 1 (Comparison)

| | Pigment concentrate | | Coating | |
|---|---|---|---|---|
| | Viscosity | Foam | Colour intensity/ transparency | Gloss 20°/60° |
| IRGALITHROT FBN | 2 | 1 | 2 | 40/79 |
| Heliogen Blue | 2 | 1 | 2 | —/102 |
| Bayferrox 130FS | 2 | 1 | * | —/63 |
| PRINTEX 35 | 2 | 2 | 3 | 32/64 |

Comb Copolymer 2

| | Pigment concentrate | | Coating | |
|---|---|---|---|---|
| | Viscosity | Foam | Colour intensity/ transparency | Gloss 20°/60° |
| IRGALITHROT FBN | 1 | 1 | 1 | 55/83 |
| Heliogen Blue | 1 | 1 | 2 | —/135 |
| Bayferrox 130FS | 1 | 1 | * | —/64 |
| PRINTEX 35 | 1 | 1 | 2 | 50/78 |

Evaluation scale: (visual/mechanical)
1 good
2 satisfactory
3 unsatisfactory
* covering pigment, cannot be evaluated The gloss or haze is determined with the assistance of the haze-gloss measuring apparatus from Byk Gardner.

3.4 Solvent-Containing UV Coating Materials
3.4.1 Composition

| Pigment | Heliogen Blue L6700 F | Hostaperm ER 02 |
|---|---|---|
| Laromer PE 56 F | 28% by weight | 24% by weight |
| TPGDA | 50.4% by weight | 50% by weight |
| Comb copolymer 2 | 3.6% by weight | 6% by weight |
| Amount of pigment | 18% by weight | 20% by weight |

3.4.2 Composition

| Pigment | Heliogen Blue L6700 F | Hostaperm ER 02 |
|---|---|---|
| Laromer 8987 | 28% by weight | 24% by weight |
| TPGDA | 50.4% by weight | 50% by weight |
| Comb copolymer 2 | 3.6% by weight | 6% by weight |
| Amount of pigment | 18% by weight | 20% by weight |

TPGDA: tripropylene glycol diacrylate
Laromer PE 56 F: polyester acrylate
Laromer 8987: polyurethane acrylate
Heliogen Blue L6700 F: Cu phthalocyanine epsilon PB 15: 6 BET 54
Hostaperm ER 02: quinacridone PV 19 BET 83

The pigment and the dispersant (comb copolymer) are weighed successively into the reactive solvent TPGDA. The mixture is dispersed for 30 min at 800 rpm at 40° C. with the assistance of a dispermat. Once dispersion has taken place, the material to be ground is added to the acrylate components and homogenised for a further 10 min at 2000 rpm. Afterwards, the coating material is applied.

3.5.1 Test Results of the UV Coating Material According to 3.4.1

| | Viscosity | Transparency | Gloss 60° |
|---|---|---|---|
| Heliogen Blue L6700 F | 1 | 1 | 65 |
| Hostaperm ER 02 | 1-2 | 1 | 77 |

3.5.2 Test Results of the UV Coating Material According to 3.4.2

| | Viscosity | Transparency | Gloss 60° |
|---|---|---|---|
| Heliogen Blue L6700 F | 1 | 1 | 65 |
| Hostaperm ER 02 | 1 | 2 | 64 |

Evaluation in accordance with the foregoing evaluation scale

Gloss determined with the assistance of the above-specified apparatus.

We claim:

1. A comb (block) copolymer obtained by reacting
   I at least one (block) copolymer comprising polymerized, optionally substituted styrene and maleic anhydride units, which copolymer has been obtained by controlled free-radical polymerization,
   with
   II at least one polyalkylene oxide monoamine comprising a primary amino end group at a reaction temperature of $\geq 150°$ C. and by subsequent salification of at least 25 mol % of the free carboxyl groups of the reaction product at a reaction temperature of <100° C. and optionally after addition of $H_2O$.

2. A comb (block) copolymer according to claim 1, wherein (block) copolymer I is obtained by C-RAFT polymerization.

3. A comb (block) copolymer according to claim 1 wherein (block) copolymer I has an alternating, gradient-type or block-type structure of the optionally substituted styrene/maleic anhydride units.

4. A comb (block) copolymer according to claim 1, wherein (block) copolymer I has a molar ratio of the optionally substituted styrene to maleic anhydride units of from 1:1 to 8:1.

5. A comb (block) copolymer according to claim 1, wherein during the reaction at the reaction temperature of $\geq 150°$ C., only a part of the polyalkylene oxide monoamine comprising a primary amino end group is reacted.

6. Comb (block) copolymer according to claim 5, wherein at least 50% by weight of the polyalkylene oxide monoamine comprising a primary amino end group is reacted at $\geq 150°$ C.

7. A comb (block) copolymer according to claim 1, wherein the polyalkylene oxide monoamine component comprising a primary amino end group is made up of ethylene oxide and/or propylene oxide units.

8. A comb (block) copolymer according to claim 7, wherein the molar ratio of the ethylene oxide units to the propylene oxide units is 5:95 to 100:0.

9. A comb (block) copolymer according to claim 1, wherein the first part of the total amount of the polyalkylene oxide monoamine comprising a primary amino end group is added during the reaction at $\geq 150°$ C. and the remainder is added, optionally with the addition of a tertiary monoamine, after lowering the reaction temperature to below 100° C.

10. A comb (block) copolymer according to claim 1, wherein the salification is carried out with the addition of a further amino component.

11. A comb (block) copolymer according to claim 10, wherein said further amino component is at least one polyalkylene oxide monoamine which comprises a primary amino end group and is different from the polyalkylene oxide monoamine which comprises a primary amino end group and has already been used for the reaction, optionally mixed with a tertiary monoamine.

12. A comb (block) copolymer according to claim 1, wherein water is added for the salification.

13. Wetting agent and dispersant comprising a comb (block) copolymer of claim 1.

14. A method for wetting solids and dispersing them in a carrier medium, which comprises introducing a comb (block) copolymer of claim 1 into said carrier medium and stirring the solids into the medium.

15. Method of claim 14, wherein said solids are pigments and/or fillers.

16. A process for production and/or processing of pigment concentrates or pigment pastes, which comprises the method of claim 15.

17. A process for the production and/or processing of coating materials, printing inks, inks for inkjet processes, paper coatings, leather and/or textile dyes, ceramics or cosmetic preparations, which comprises the method of claim 15.

18. A process for the production and/or processing of casting and/or moulding compositions comprised of synthetic, semi-synthetic or natural polymers, which comprises the method of claim 15.

19. Method of claim 15, further comprising the addition of binders to said medium.

20. Coating materials, pastes or moulding compositions containing at least one comb (block) copolymer of claim 1 as wetting agent and dispersant, at least one pigment, optionally an organic or aqueous medium, optionally at least one binder and/or optionally further conventional auxiliary substances and optionally at least one further wetting agent and dispersant.

21. A pigment, the surface of which is modified by at least one comb (block) copolymer of claim 1.

22. The comb (block) copolymer of claim 2, wherein said polymerization is conducted in the presence of 2,4-diphenyl-4-methyl-1-pentene as chain-transfer compound.

23. The comb (block) copolymer of claim 4, wherein said molar ratio of the optionally substituted styrene to maleic anhydride units is from 1:1 to 2:1.

24. The comb (block) copolymer of claim 8, wherein said molar ratio of the ethylene oxide units to the propylene oxide units is from 30:70 to 70:30.

* * * * *